United States Patent
Hu et al.

(10) Patent No.: US 8,536,823 B2
(45) Date of Patent: Sep. 17, 2013

(54) DRIVING METHOD AND DRIVING DEVICE FOR DRIVING A POLYPHASE INVERTER

(75) Inventors: Jwu-Sheng Hu, Hsinchu (TW); Keng-Yuan Chen, Jhonghe (TW)

(73) Assignee: National Chiao Tung University, Hsinchu (TW)

( * ) Notice: Subject to any disclaimer, the term of this patent is extended or adjusted under 35 U.S.C. 154(b) by 633 days.

(21) Appl. No.: 12/683,657

(22) Filed: Jan. 7, 2010

(65) Prior Publication Data
US 2010/0309693 A1 Dec. 9, 2010

(30) Foreign Application Priority Data
Jun. 4, 2009 (TW) ................................ 98118543 A

(51) Int. Cl.
*H02P 27/04* (2006.01)
(52) U.S. Cl.
USPC .......................................... 318/801; 318/638

(58) Field of Classification Search
USPC ................. 318/727, 629, 632, 638, 606, 798, 318/801
See application file for complete search history.

(56) References Cited

U.S. PATENT DOCUMENTS

| | | | | |
|---|---|---|---|---|
| 4,689,819 A * | 8/1987 | Killion | .......................... | 381/321 |
| 5,317,640 A * | 5/1994 | Callias | .......................... | 381/321 |
| 5,646,499 A * | 7/1997 | Doyama et al. | ............... | 318/801 |
| 6,731,162 B2 * | 5/2004 | Yeongha et al. | ................. | 330/10 |
| 6,778,768 B2 * | 8/2004 | Ohkawara et al. | .............. | 396/55 |
| 6,885,160 B2 * | 4/2005 | Takeuchi | ...................... | 318/139 |

* cited by examiner

*Primary Examiner* — Rina Duda
(74) *Attorney, Agent, or Firm* — Foley & Lardner LLP

(57) ABSTRACT

A driving method for driving a polyphase inverter includes: receiving a reference input that includes a fundamental frequency component, and a previously generated feedback signal; generating an error signal that corresponds to a difference between the reference input and the previously generated feedback signal; attenuating the error signal to the minimum; generating an optimum signal; quantizing the optimum signal; and generating driving signals that correspond to the quantized optimum signal. A driving device that implements the driving method is also disclosed.

45 Claims, 19 Drawing Sheets

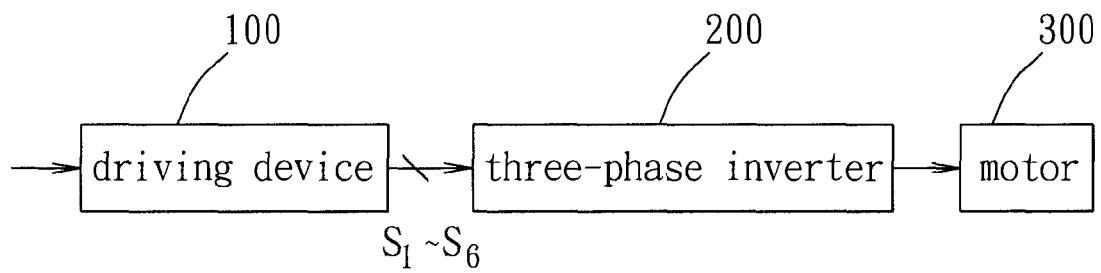
F I G. 3

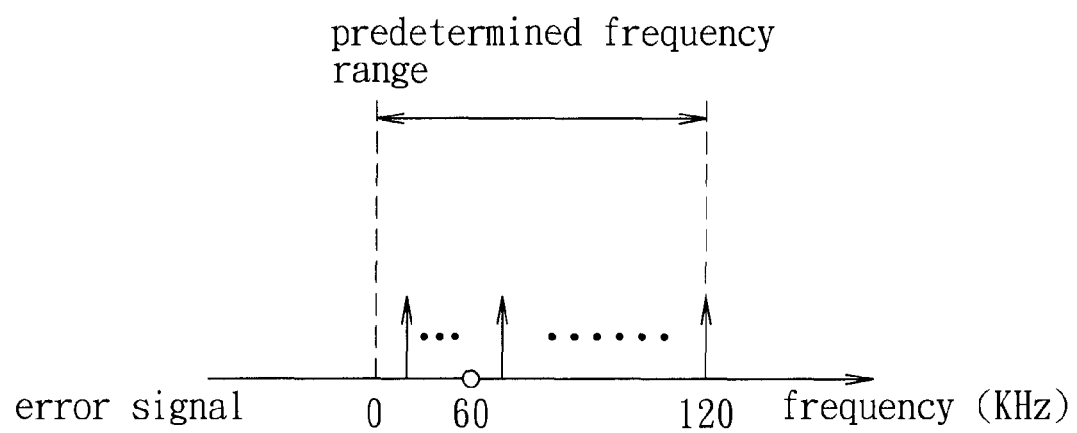
F I G. 7

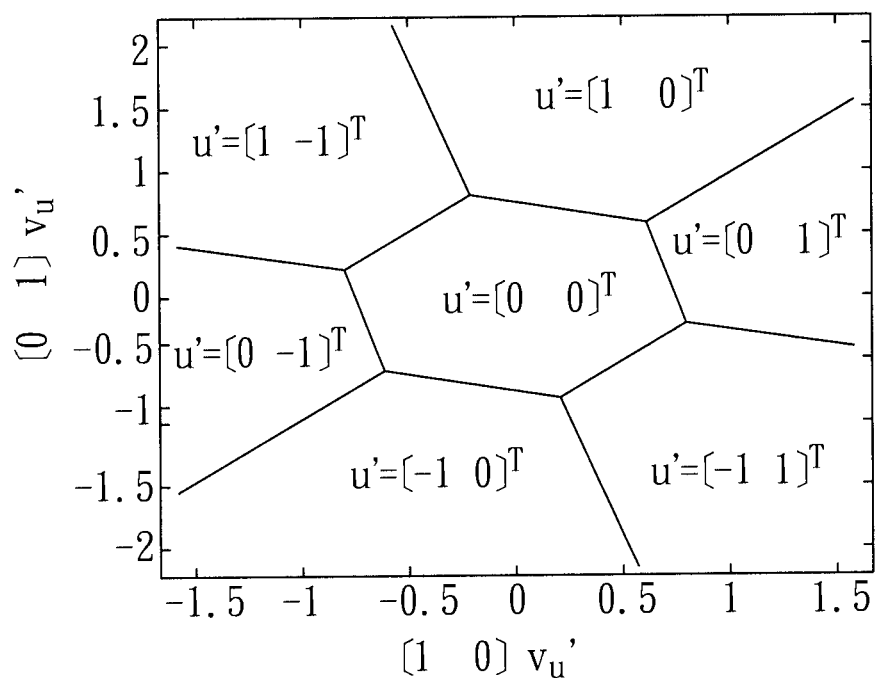
F I G. 8

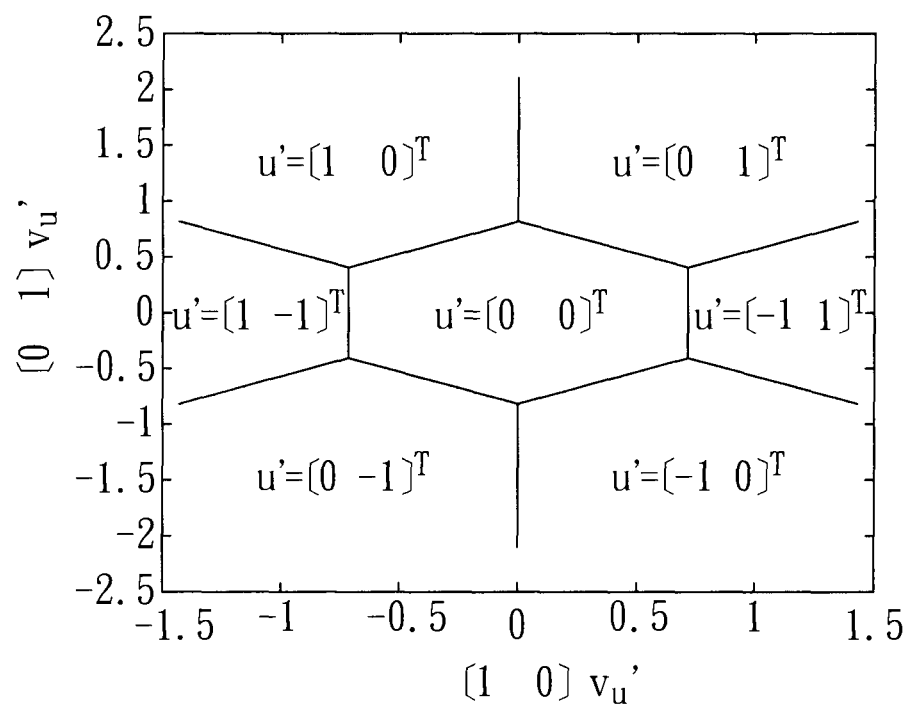
F I G. 9

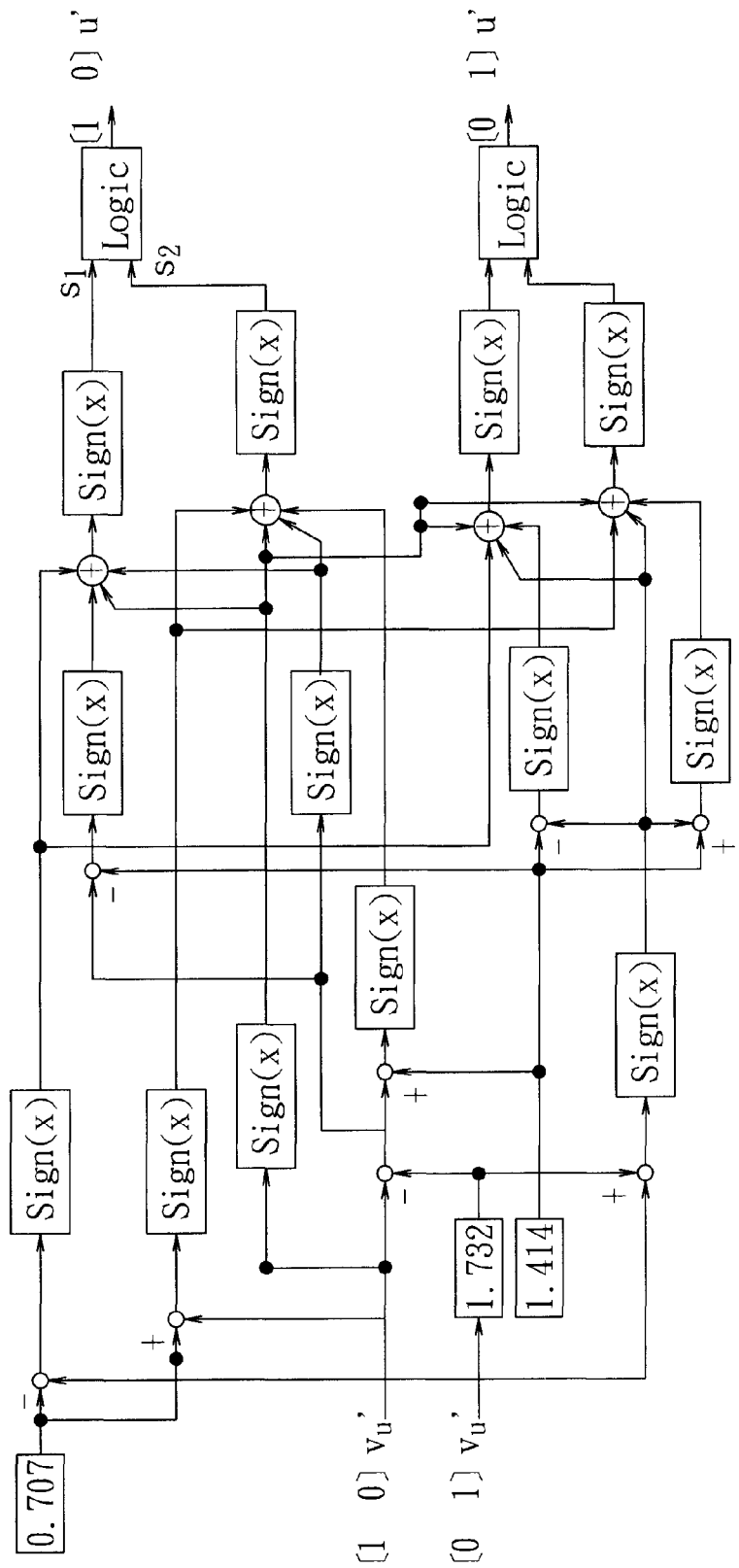
F I G. 11

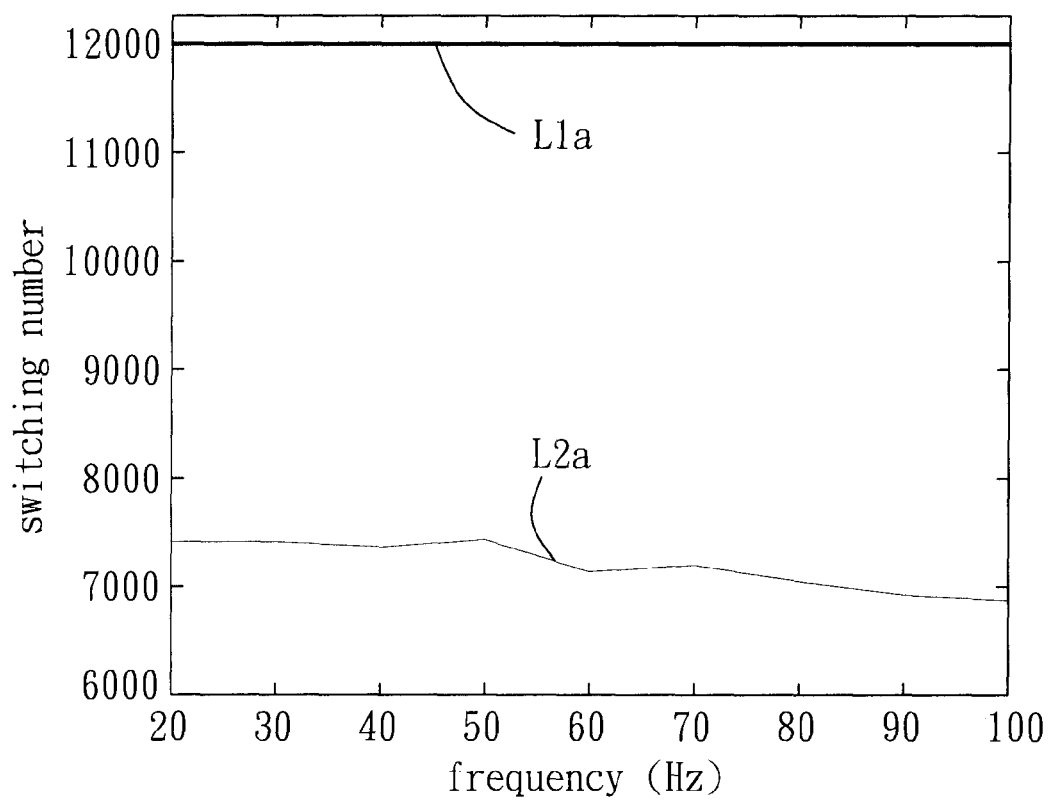
F I G. 12

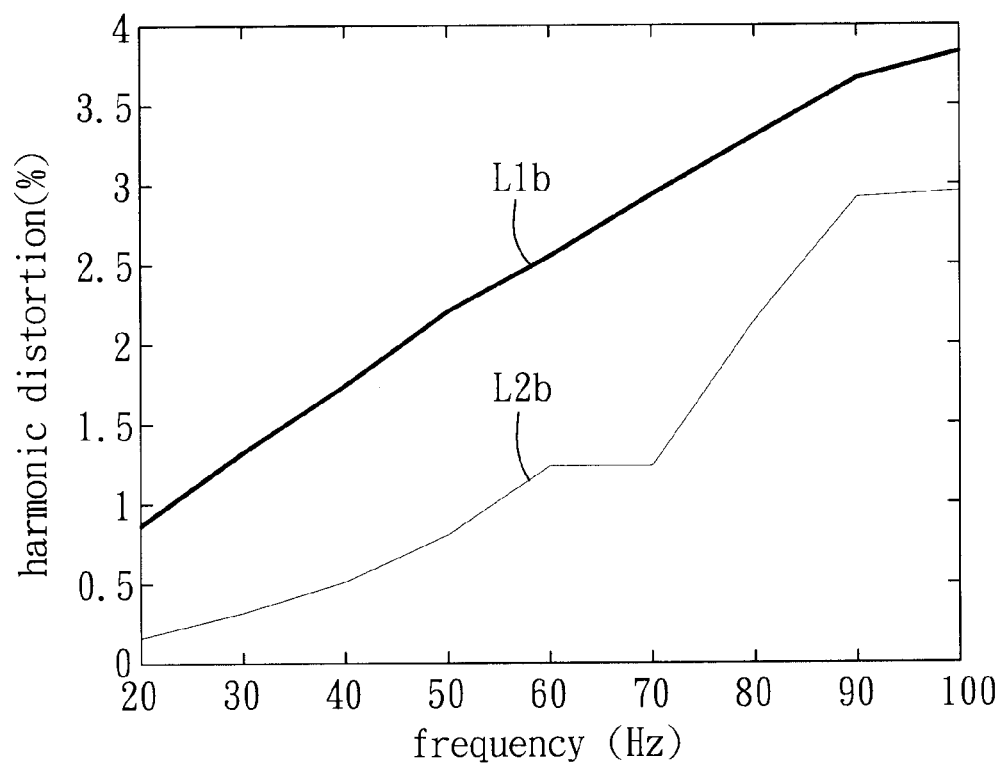
F I G. 13

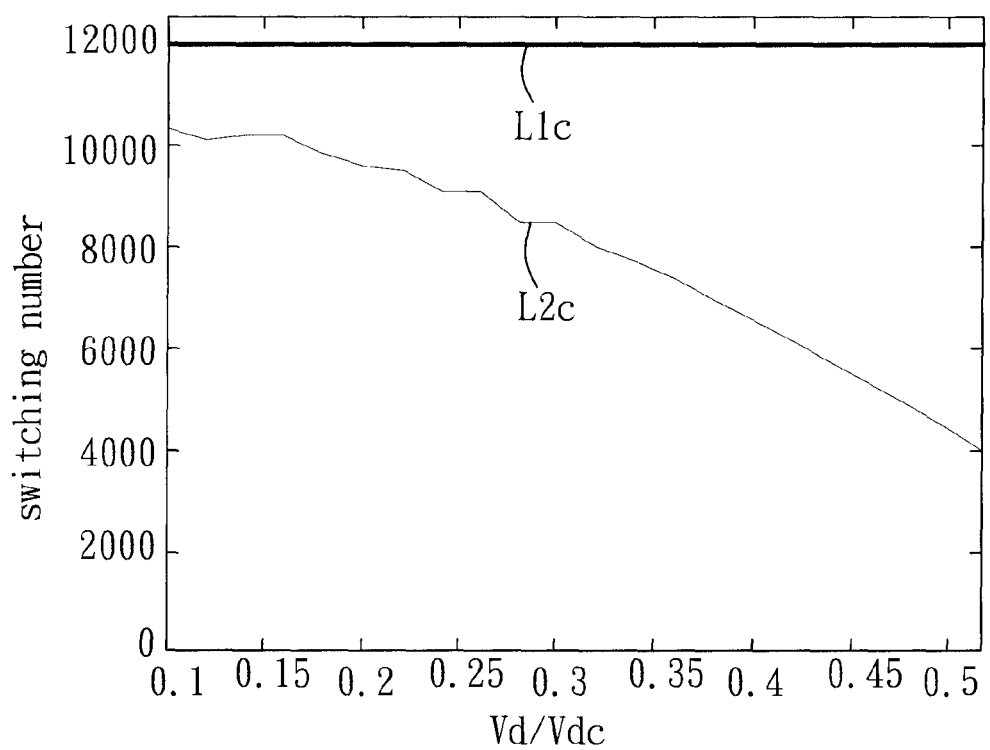
F I G. 14

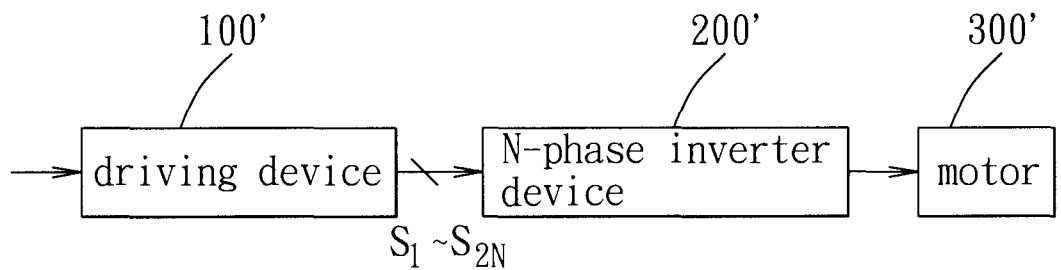
F I G. 17

DRIVING METHOD AND DRIVING DEVICE FOR DRIVING A POLYPHASE INVERTER

CROSS-REFERENCE TO RELATED APPLICATION

This application claims priority of Taiwanese application no. 098118543, filed on Jun. 4, 2009.

BACKGROUND OF THE INVENTION

1. Field of the Invention

This invention relates to a driving method and driving device for driving a polyphase inverter.

2. Description of the Related Art

FIG. 1 illustrates a conventional three-phase inverter 900 that includes three inverter legs, each of which has upper and lower transistors (M1 and M2, M3 and M4, and M5 and M6). The transistors (M1 to M6) of the conventional three-phase inverter 900 are switched on and off by driving signals ($S_1$ to $S_6$) generated by a driving device 950 to thereby permit the conventional three-phase inverter 900 to generate inverter output voltages (Va, Vb, Vc), whereby three sinusoidal signals that have equal amplitudes and that are 120° out of phase are generated. The driving device 950 typically uses a sinusoidal pulse width modulation (SPWM) technique or a space vector PWM (SVPWM) technique to generate the driving signals ($S_1$ to $S_6$). However, the number of times the transistors (M1 to M6) of the conventional three-phase inverter 900 are switched on and off when driven by the driving signals ($S_1$ to $S_6$) generated by the driving device 950 is determined by the carrier frequency of the driving device 950, is fixed, and is relatively high. This increases power consumption, and thus decreases efficiency of the conventional three-phase inverter 900.

SUMMARY OF THE INVENTION

Therefore, an object of the present invention is to provide a driving method for driving a polyphase inverter that can overcome the aforesaid drawbacks of the prior art.

Another object of the present invention is to provide a driving device for driving a polyphase inverter that can overcome the aforesaid drawbacks of the prior art.

According to an aspect of the present invention, a driving method for driving a polyphase inverter to be implemented by a driving device comprises:

A) configuring the driving device to receive a reference input that includes a fundamental frequency component, and a previously generated feedback signal;

B) configuring the driving device to generate an error signal that corresponds to a difference between the reference input and the previously generated feedback signal;

C) configuring the driving device to attenuate the frequency components of the error signal outside a predetermined frequency band to the minimum;

D) configuring the driving device to generate an optimum signal so that the magnitude of error signal within a predetermined frequency band is minimum; and E) configuring the driving device to quantize the optimum signal, and to generate driving signals that correspond to the quantized optimum signal, wherein the driving signals are for driving the polyphase inverter.

According to another aspect of the present invention, a driving device for driving a polyphase inverter comprises a subtracting circuit, a filter module, and a quantizing module.

The subtracting circuit is configured to receive a reference input that includes a fundamental frequency component, and a previously generated feedback signal and to generate an error signal that corresponds to a difference between the reference input and the previously generated feedback signal. The filter module is coupled to the subtracting circuit, and is configured to attenuate the magnitude of the error signal to the minimum, and to generate an optimum signal. The quantizing module is coupled to the filter module, and is configured to quantize the optimum signal, and to generate driving signals that correspond to the quantized optimum signal. The driving signals are for driving the polyphase inverter.

BRIEF DESCRIPTION OF THE DRAWINGS

Other features and advantages of the present invention will become apparent in the following detailed description of the preferred embodiments with reference to the accompanying drawings, of which:

FIG. 3 is a block diagram to illustrate driving signals generated by the first preferred embodiment for driving a three-phase inverter;

FIG. 7 is a plot of a frequency spectrum of an error signal generated by the first preferred embodiment;

FIGS. 8 and 9 are plots to illustrate possible values for a control signal generated by the first preferred embodiment;

FIG. 11 is a block diagram to illustrate a quantizing circuit of the first preferred embodiment;

FIG. 12 is a plot to illustrate the number of times the polyphase inverter is switched on and off when driven by the first preferred embodiment as a function of a frequency of a reference input;

FIG. 13 is a plot to illustrate the harmonic distortion generated by the polyphase inverter when driven by the first preferred embodiment as a function of the frequency of the reference input;

FIG. 14 is a plot to illustrate the number of times the polyphase inverter is switched on and off when driven by the first preferred embodiment as a function of a ratio of an amplitude of the reference input (Vd) to a DC power source (Vdc) of the three-phase inverter;

FIG. 17 is a block diagram to illustrate driving signals generated by the second preferred embodiment for driving a N-phase inverter, where N>3;

DETAILED DESCRIPTION OF THE PREFERRED EMBODIMENTS

Figure 1:
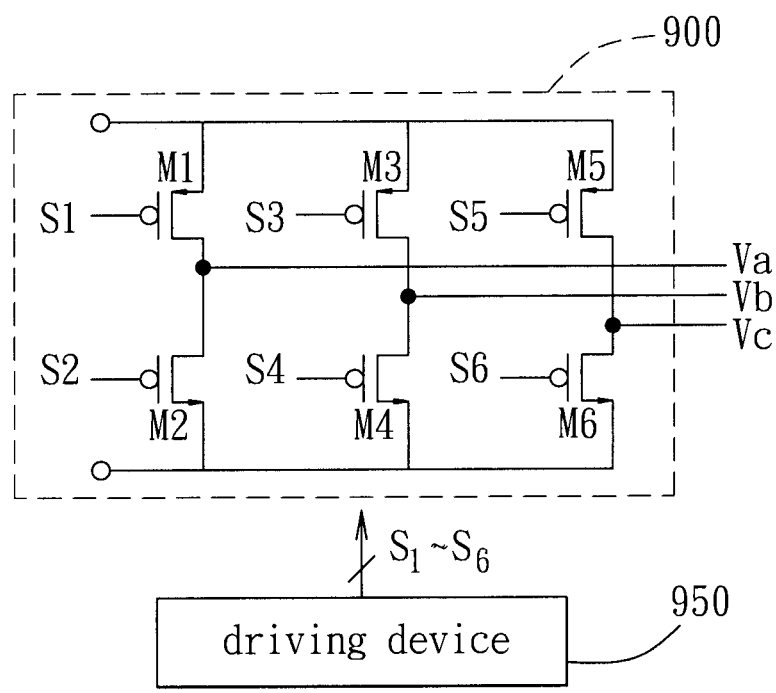
FIG. 1 is a circuit diagram of a conventional three-phase inverter.

Before the present invention is described in greater detail, it should be noted that like elements are denoted by the same reference numerals throughout the disclosure.

Figure 2:
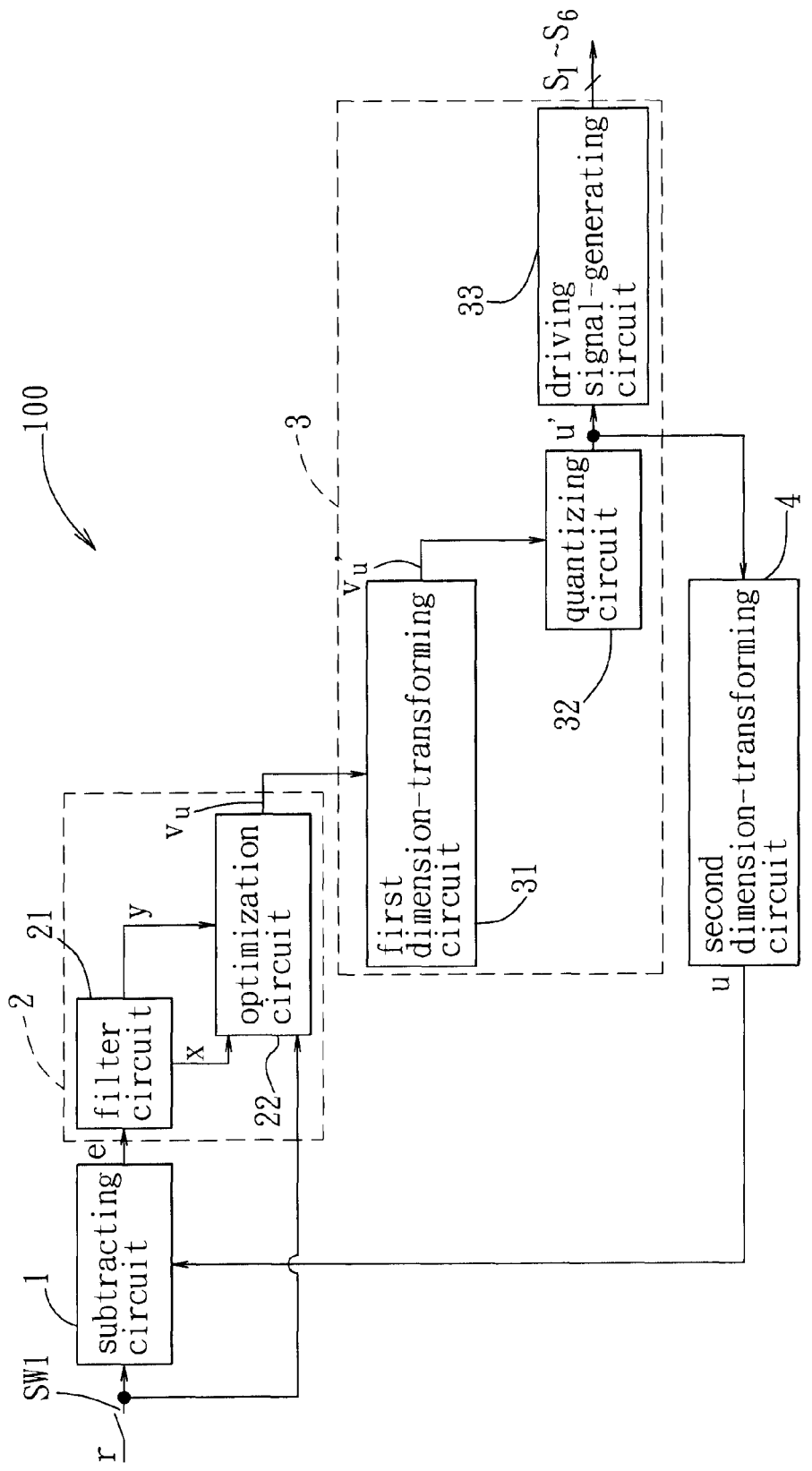
FIG. 2 is a block diagram of the first preferred embodiment of a driving device according to the present invention.

Referring to FIGS. 2 and 3, the first preferred embodiment of a driving device 100 according to this invention is shown to include a subtracting circuit 1, a filter module 2, and a quantizing module 3.

The driving device 100 of this embodiment is applicable to generate driving signals ($S_1$ to $S_6$) for driving a three-phase inverter 200 to thereby permit the three-phase inverter 200 to generate output voltages that contain three sinusoidal signals that have equal amplitudes and that are 120° out of phase. The three sinusoidal signals generated by the three-phase inverter 200 are for driving a motor 300, such as a Y-type motor or a Δ-type motor.

Although the motor 300 is exemplified as a Y-type motor or a Δ-type motor, it should be apparent to those skilled in the art that the motor 300 may be of any type according to requirements.

The three-phase inverter 200 in this embodiment includes three inverter legs 210, each of which includes upper and lower transistors (M1 to M6) that are switched on and off, whereby an inverter output voltage (Va, Vb, Vc) is generated by each inverter leg 210.

In order to eliminate the possibility of a short circuit or a floating state, when the upper transistor (M1, M3, M5) is switched on, the corresponding lower transistor (M2, M4, M6) is switched off, and when the lower transistor (M2, M4, M6) is switched on, the corresponding upper transistor (M1, M3, M5) is switched off. As such, there are eight possible combinations of switch states for the upper and lower transistors (M1 to M6). The eight possible combinations of the switch states and corresponding output line-to-line voltages (Vab, Vbc, Vca) are shown in Table I, where Vab=Va−Vb, Vbc=Vb−Vc, and Vca=Vc−Va.

TABLE I

| Vab | Vbc | Vca | M1 | M2 | M3 | M4 | M5 | M6 |
|---|---|---|---|---|---|---|---|---|
| 0 | 0 | 0 | Off | On | Off | On | Off | On |
| 1 | 0 | −1 | On | Off | Off | On | Off | On |
| 0 | 1 | −1 | On | Off | On | Off | Off | On |
| −1 | 1 | 0 | Off | On | On | Off | Off | On |
| −1 | 0 | 1 | Off | On | On | Off | On | Off |
| 0 | −1 | 1 | Off | On | Off | On | On | Off |
| 1 | −1 | 0 | On | Off | Off | On | On | Off |
| 0 | 0 | 0 | On | Off | On | Off | On | Off |

Figure 4:
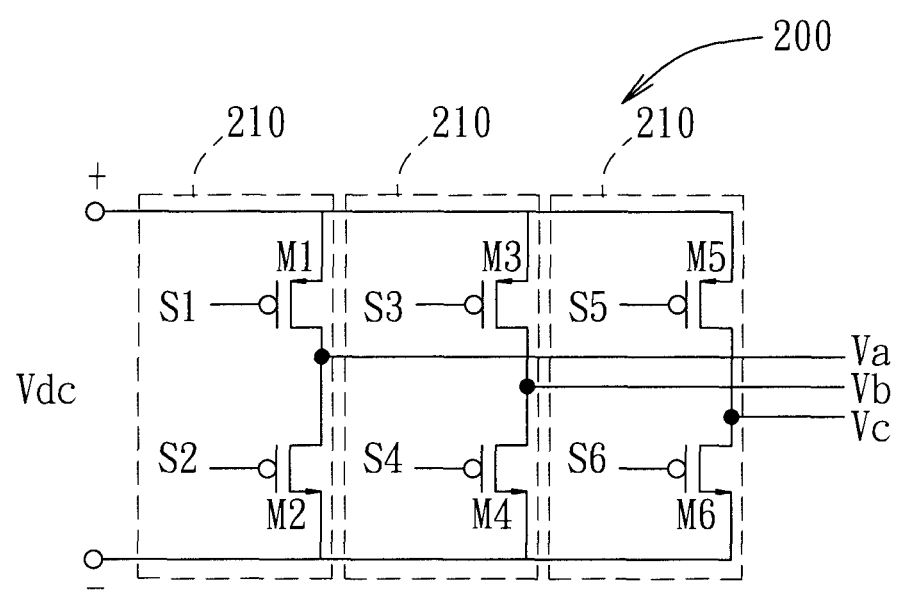
FIG. 4 is a circuit diagram of the three-phase inverter to be driven by the first preferred embodiment.

As illustrated in FIG. 4, the three-phase inverter 200 is connected across positive (+) and negative (−) terminals of a DC power source (Vdc). In this embodiment, the DC power source is 40 Vdc. As such, the values 1, 0, and −1 for the output line-to-line voltages (Vab, Vbc, Vca) are equivalent to 40V, 0V, and −40V, respectively.

The filter module 2 includes a filter circuit 21 connected to the subtracting circuit 1, and an optimization circuit 22 connected to the filter circuit 21. The quantizing module 3 includes a first dimension-transforming circuit 31 connected to the optimization circuit 22, a quantizing circuit 32 connected to the first dimension-transforming circuit 31, and a driving signal-generating circuit 33 connected to the quantizing circuit 32. In this embodiment, the quantizing circuit 32 and the driving signal-generating circuit 33 constitute a quantizing unit.

Figure 5:
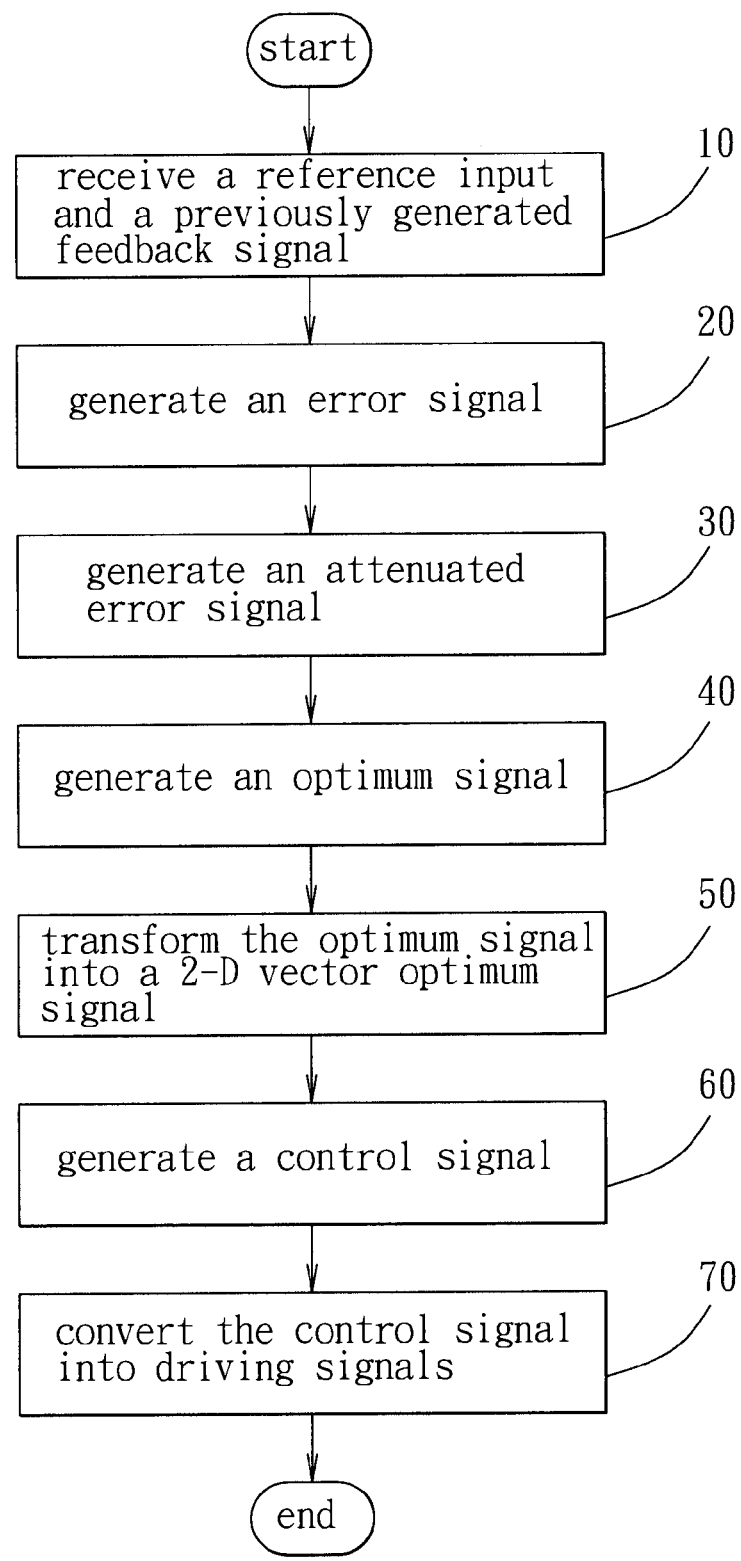
FIG. 5 is a flow chart of the first preferred embodiment of a driving method according to the present invention to be implemented using the driving device shown in FIG. 2.

The first preferred embodiment of a driving method for driving the three-phase inverter 200 to be implemented by the aforementioned driving device 100 according to this invention will now be described with further reference to FIG. 5.

In step 10, the subtracting circuit 1 is configured to receive a reference input (r) and a previously generated feedback signal (u).

The reference input (r) received in this step is provided by an alternating current (AC) power source (not shown) and has three AC signals that are each 60 Hz and that are 120° out of phase.

It should be understood that the frequency 60 Hz is only exemplary and other frequencies are applicable.

The previously generated feedback signal (u) received in this step is a non-periodic digital signal.

In this embodiment, the instantaneous sum of the AC signals of the reference input (r) is zero. That is, at any given time, the summation of the AC signals of the reference input (r) is zero. Moreover, in this embodiment, the summation of the output line-to-line voltages (Vab, Vbc, Vca) is zero. As such, [1 1 1] r=0 and [1 1 1] u=0 are always satisfied.

In step 20, the subtracting circuit 1 is configured to generate an error signal (e) that corresponds to a difference between the reference input (r) and the previously generated feedback signal (u) received thereby in step 10 and to send the error signal (e) to the filter circuit 21.

The error signal (e) is generated in this step according to $$e = r - u \qquad (1)$$

Figure 6:
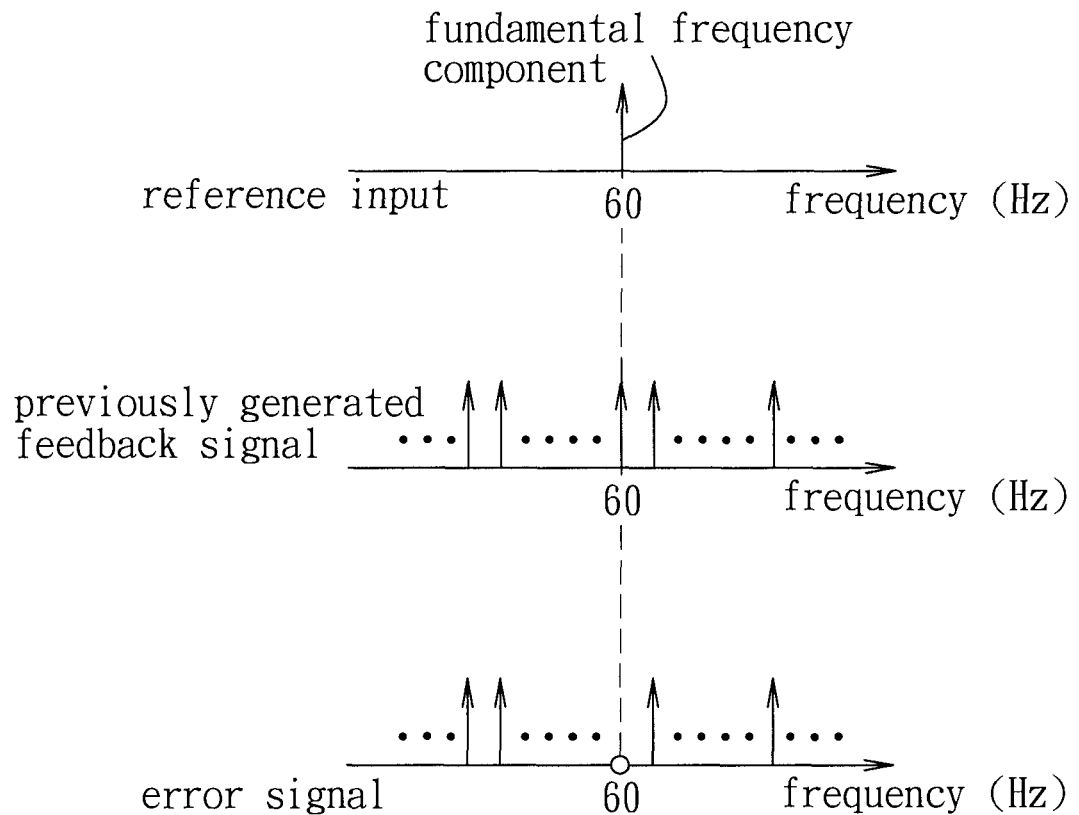
FIG. 6 are plots of frequency spectra of a reference input, a previously generated feedback signal, and an error signal generated by the first preferred embodiment.

As illustrated in FIG. 6, the reference input (r) received in step 10 includes a 60-Hz fundamental frequency component, and the previously generated feedback signal (u) received in step 10 includes the fundamental frequency component and noise components. Accordingly, the error signal (e) generated in this step is the signal that we want it to be as small as possible.

In step 30, with further reference to FIG. 7, the filter circuit 21 is configured to receive the error signal (e) sent in step 20, to attenuate the frequency components of the error signal (e) received thereby that are outside of a predetermined frequency range, i.e., from 0 Hz to 120 Hz, to the minimum, thereby achieving noise shaping, to generate a weighted error signal (y), and to send the weighted error signal (y) generated thereby and a state parameter (x) of the filter circuit 21 to the optimization circuit 22.

The weighted error signal (y) is generated in this step using a frequency weighting function, which is defined as $$x(k+1) = Ax(k) + Be(k) \qquad (2)$$

and $$y(k) = Cx(k) + De(k) \qquad (3)$$

where: $x \in R^{3n \times 3n}$ is the state parameter of the filter circuit 21; $e \in R^{3 \times 1}$ is the error signal; $A \in R^{3n \times 3n}$, $B \in R^{3n \times 3}$, $C \in R^{3 \times 3n}$, and $D \in R^{3 \times 3}$ are predefined weight parameters; and $y \in R^{3 \times 1}$ is the weighted error signal.

The output line-to-line voltages (Vab, Vbc, Vca) have a frequency that varies with the desired rotation speed of the motor 300 within the predetermined frequency range. As such, frequencies outside of the predetermined frequency range are regarded as noise and are therefore attenuated, i.e., filtered out, in this step. Accordingly, the attenuated error signal (y) generated in this step includes the frequency components of the error signal (e) that are within the predetermined frequency range.

The predetermined frequency range is determined by adjusting the predefined weight parameters (A, B, C, D).

Figure 10:
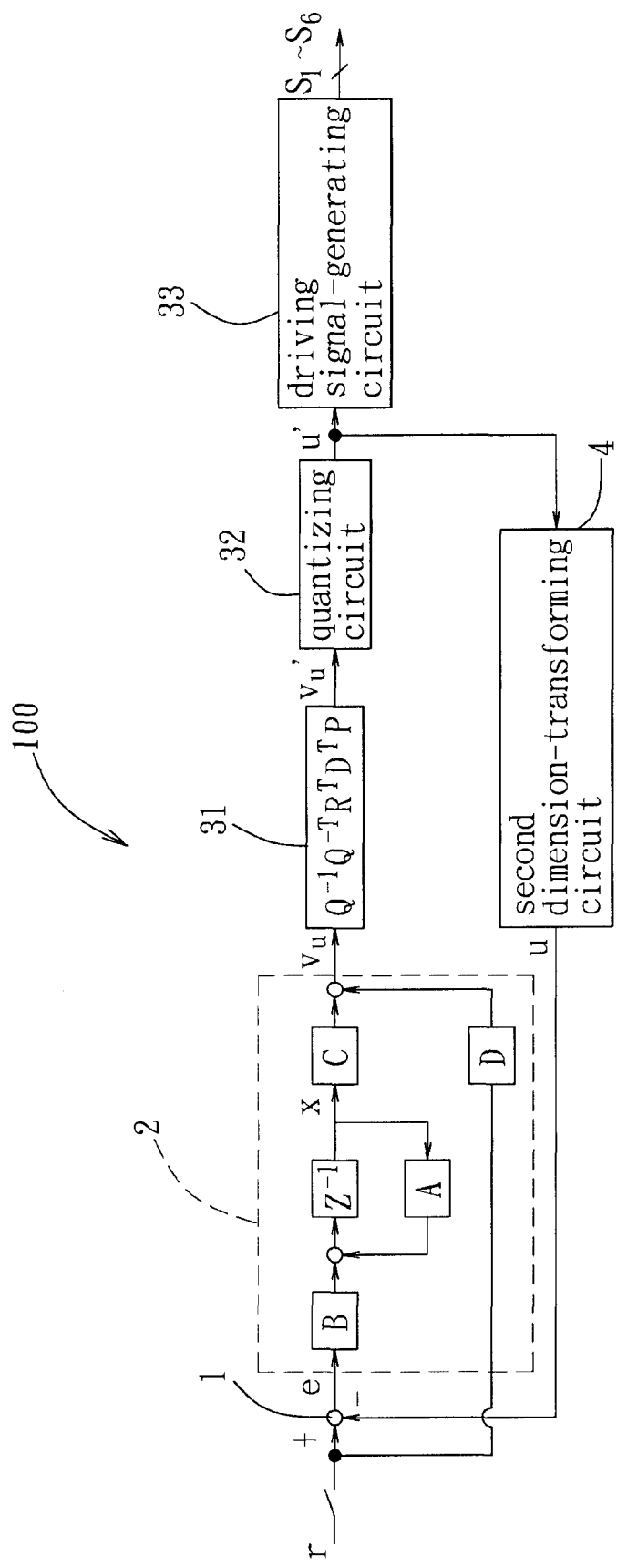
FIG. 10 is a block diagram to illustrate a filter module of the first preferred embodiment.

As illustrated in FIG. 10, the frequency components of the error signal (e) that are outside of the predetermined frequency range may be attenuated by the filter circuit 21 to the minimum by determining appropriate values for the predefined weight parameters (A, B, C, D).

In step 40, the optimization circuit 22 is configured to receive the weighted error signal (y) and the state parameter (x) sent by the filter circuit 21 in step 30 and the reference input (r), to attenuate the weighted error signal (y) to the minimum, to generate an optimum signal ($v_u$), and to send the optimum signal ($v_u$) to the first dimension-transforming circuit 31.

In this step, the weighted error signal (y) is attenuated to the minimum using an optimization function, which is defined as $$V = y(k)^T P y(k) \tag{4}$$

where P is a predefined parameter that is in the form of a matrix, $P^T = P > 0$, and T is a transformation operation.

The optimum signal ($v_u$) is generated in this step according to $$v_u = Cx(k) + Dr(k) \tag{5}$$

In this embodiment, Equation (5) is derived from Equations (1), (3), and (4).

The optimum signal ($v_u$) generated in this step is a three-dimensional (3-D) vector optimum signal and corresponds to one of the eight aforementioned combinations of the output line-to-line voltages (Vab, Vbc, and Vca), and thus may be further represented as a two-dimensional (2-D) vector optimum signal.

In step 50, the first dimension-transforming circuit 31 is configured to receive the 3-D vector optimum signal ($v_u$) sent in step 40, to transform the 3-D vector optimum signal ($v_u$) received thereby into a 2-D vector optimum signal ($v_u'$), and to send the 2-D vector optimum signal ($v_u'$) thus transformed to the quantizing circuit 32.

In this step, the optimum signal ($v_u$) is transformed into the 2-D vector optimum signal ($v_u'$) according to $$v_u' = Q^{-1} Q^{-T} R^T D^T P v_u \tag{6}$$

where $v_u' \in R^{2 \times 1}$, $Q^T Q = R^T D^T P D R$, $Q \in R^{2 \times 2}$, $$R = \begin{bmatrix} 1 & 0 & -1 \\ 0 & 1 & -1 \end{bmatrix}^T$$

is a predefined parameter, and P and T are as previously defined in Equation (4).

The 2-D vector optimum signal ($v_u'$) generated in this step corresponds to one of the eight aforementioned combinations, two of which are identical, of the output line-to-line voltages (Vab and Vbc, Vbc and Vca, or Vab and Vca).

In step 60, the quantizing circuit 32 is configured to receive the 2-D vector optimum signal ($v_u'$) sent in step 50, to quantize the 2-D vector optimum signal ($v_u'$) received thereby, to generate a control signal (u') that corresponds to the 2-D vector optimum signal ($v_u'$) quantized thereby, and to send the control signal (u') generated thereby to the driving signal-generating circuit 33.

The control signal (u') generated in this step is a 2-D control signal, corresponds to the output line-to-line voltages (Vab and Vbc, Vbc and Vca, or Vca and Vab), and is one of $[1 \ 0]^T$, $[0 \ 1]^T$, $[1 \ -1]^T$, $[0 \ 0]^T$, $[-1 \ 1]^T$, $[0 \ -1]^T$ and $[-1 \ 0]^T$.

FIGS. 8 and 9 illustrate the seven possible values for the control signal (u') and corresponding regions for two different values of Q, respectively. In FIGS. 8 and 9, the horizontal axis, $$[1 \ 0] v_u' = [1 \ 0] \begin{bmatrix} v_{u1}' \\ v_{u2}' \end{bmatrix} = v_{u1}',$$

is associated with the vector in the first row and first column of the 2-D vector optimum signal ($v_u'$), and the vertical axis, $$[0 \ 1] v_u' = [0 \ 1] \begin{bmatrix} v_{u1}' \\ v_{u2}' \end{bmatrix} = v_{u2}',$$

is associated with the vector in the second row and the first column of the 2-D vector optimum signal ($v_u'$).

It is noted that, in step 50, Equation (6) is derived by first substituting Equations (1) and (3) into Equation (4) to thereby obtain $$V = f(x,r) + u'^T R^T D^T P D R u' - 2u'^T R^T D^T P (Cx + Dr) \tag{7}$$

and by substituting $Q \in R^{2 \times 2}$ and $Q^T Q = R^T D^T P D R$ into (7). where $$u' = \begin{bmatrix} 1 & 0 & 0 \\ 0 & 1 & 0 \end{bmatrix} u \in R^{2 \times 1}.$$

In step 70, the driving signal-generating circuit 33 is configured to receive the control signal (u') sent in step 60, and to convert the control signal (u') received thereby into the driving signals ($S_1$ to $S_6$) with reference to a predefined look-up table, which corresponds to Table I and which is built into the quantizing module 3.

It is noted that each of the driving signals ($S_1$, $S_3$, and $S_5$) complements a respective one of the driving signals ($S_2$, $S_4$, and $S_6$). As such, when the three driving signals (e.g., $S_1$, $S_3$, $S_5$) are obtained, the remaining driving signals (i.e., $S_2$, $S_4$, $S_6$) may be obtained using a logic "not" gate.

The driving signal-generating circuit 33 may employ digital logic to construct the predefined look-up table. Since the driving signal-generating circuit 33 is known in the art, a detailed description thereof will not be provided herein for the sake of brevity.

The driving device 100 further includes a second dimension-transforming circuit 4 and a sampling switch (SW1). The second dimension-transforming circuit 4 is connected to the subtracting circuit 1 and the quantizing circuit 32, and is configured to transform the control signal (u') into a 3-D currently generated feedback signal (u). The currently generated feedback signal (u) serves as a next previously generated feedback signal inputted to the subtracting circuit 1 for use in generating a next sequence of driving signals. The sampling switch (SW1) is connected to the subtracting circuit 1, is configured to sample the reference input (r) prior to receipt by the subtracting circuit 1, and has a sampling frequency determined based on the rotation speed of the motor 300 and charge/discharge time of the transistors (M1 to M6) of the three-phase inverter 200.

In this embodiment, as illustrated in FIG. 11, the quantizing circuit 32 includes a plurality of polarity comparators (Sign(x)) and a plurality of logic comparators (Logic). Each of the polarity comparators (Sign(x)) is defined as $$\text{Sign}(x) = \begin{cases} 1, & x > 0 \\ 0, & x = 0 \\ -1, & x < 0 \end{cases}$$

and each of the logic comparators (Logic) is defined as $$\text{Logic}(s_1, s_2) = \begin{cases} 0, & s_1 \neq s_2 \\ s_1 & \text{else} \end{cases}$$

It is noted that the 0.707, 1.732, and 1.414 in FIG. 11 are generated based on the predefined weight parameters (A, B, C, D).

By transforming the 3-D vector optimum signal ($v_u$) into the 2-D vector optimum signal ($v_u'$), processing operation and circuit design of the quantizing module 3 are simplified. However, if the complexity of the circuit design of the quantizing module 3 is not an issue, the first dimension-transforming circuit 31 may be dispensed with. As such, step 50 is skipped, the optimization circuit 22 is configured to send the 3-D vector optimum signal ($v_u$) directly to the quantizing circuit 32 in step 40, and the quantizing circuit 32 is configured to receive the 3-D vector optimum signal ($v_u$), to quantize the 3-D vector optimum signal ($v_u$), and to generate a control signal (u) that corresponds to the 3-D vector optimum signal ($v_u$) obtained thereby in step 60.

As illustrated in FIG. 12, simulation experimental results, where the reference input (r) has a frequency range from 20 Hz to 100 Hz, the sampling switch (SW1) samples the reference input (r) at a sampling frequency of 3 KHz, and the feedback signal (u) has a minimum pulse width of $1/(3 \text{ k} \times 2^2) = 1/12000$ seconds, show that the number of times (L2a), i.e., less than 8000 times, the transistors (M1 to M6) of the three-phase inverter 200 are switched on and off when driven by the driving signals (S1 to S6) generated by the driving device 100 of this embodiment is at least 30% lower than the number of times (L1a), i.e., 12000 times, the transistors (M1 to M6) of the three-phase inverter 200 are switched on and off when driven by driving signals generated using space vector pulse wave modulation (SVPWM) technique.

In addition, as illustrated in FIG. 14, simulation results, where the sampling switch (SW1) samples the reference input (r) at a sampling frequency of 3 KHz and the feedback signal (u) has a minimum pulse width of $1/(3 \text{ k} \times 2) = 1/6000$ seconds, show that the number of times (L2c) the transistors (M1 to M6) of the three-phase inverter 200 are switched on and off when driven by the driving signals (S1 to S6) generated by the driving device 100 of this embodiment is lower than the number of times (L1c) the transistors (M1 to M6) of the three-phase inverter 200 are switched on and off when driven by driving signals generated using the SVPWM technique.

From the foregoing, the three-phase inverter 200 when driven by driving signals ($S_1$ to $S_6$) generated by the driving device 100 of this embodiment achieves relatively low power consumption and therefore has a high efficiency.

Moreover, as illustrated in FIG. 13, simulation results, where the reference input (r) has a frequency range from 20 Hz to 100 Hz, the sampling switch (SW1) samples the reference input (r) at a sampling frequency of 3 KHz, and the feedback signal (u) has a minimum pulse width of $1/(3 \text{ k} \times 2^2) = 1/12000$ seconds, show that the harmonic distortion (L2b) generated by the three-phase inverter driven by the driving signals ($S_1$ to $S_6$) generated by the driving device 100 of this embodiment is considerably lower than the harmonic distortion (L1b) generated by the three-phase inverter driven by the driving signals generated using the SVPWM technique.

Figure 15:
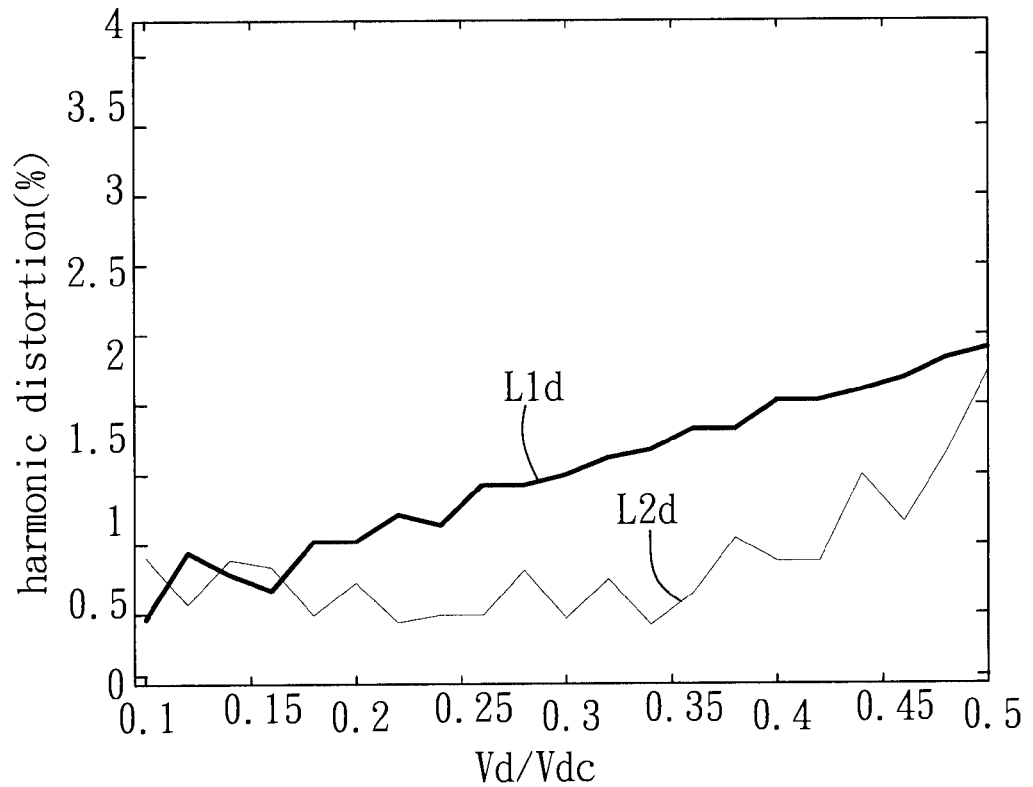
FIG. 15 is a plot to illustrate the harmonic distortion generated by the polyphase inverter when driven by the first preferred embodiment as a function the ratio of the amplitude of the reference input (Vd) to the DC power source (Vdc) of the three-phase inverter.

Furthermore, as illustrated in FIG. 15, simulation results, where the sampling switch (SW1) samples the reference input (r) at a sampling frequency of 3 KHz and the feedback signal (u) has a minimum pulse width of $1/(3 \text{ k} \times 2) = 1/6000$ seconds, show that the harmonic distortion (L2d) generated by the three-phase inverter driven by the driving signals ($S_1$ to $S_6$) generated by the driving device 100 of this embodiment is considerably lower than the harmonic distortion (L1d) generated by the three-phase inverter driven by the driving signals generated using the SVPWM technique.

Figure 16:
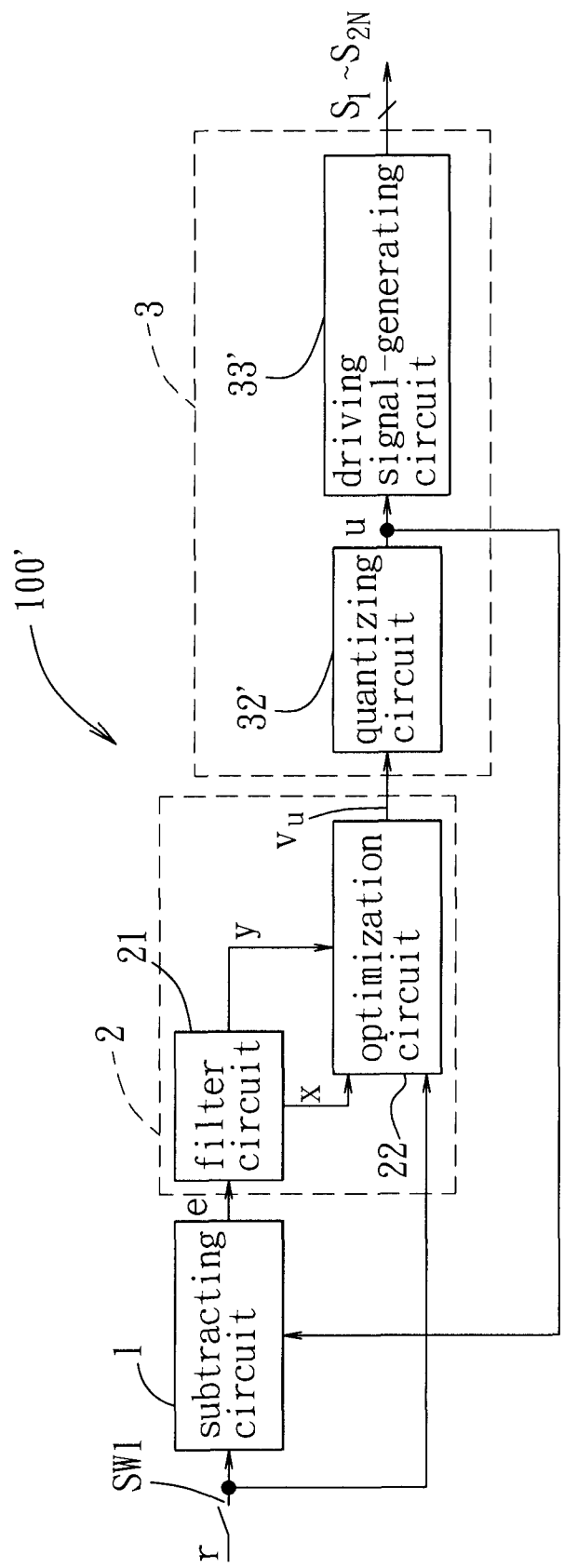
FIG. 16 is a block diagram of the second preferred embodiment of a driving device according to the present invention.

FIG. 16 illustrates the second preferred embodiment of a driving device 100' according to this invention. When compared to the previous embodiment, as illustrated in FIG. 17, the driving device 100' of this embodiment is applicable to generate driving signals ($S_1$ to $S_{2N}$) for driving a N-phase inverter 200', where N>3, to thereby permit the N-phase inverter 200' to generate output voltages that contain sinusoidal signals that have equal amplitude and that are 360°/N out of phase. The sinusoidal signals generated by the N-phase inverter 200' are for driving a motor 300'.

Figure 18:
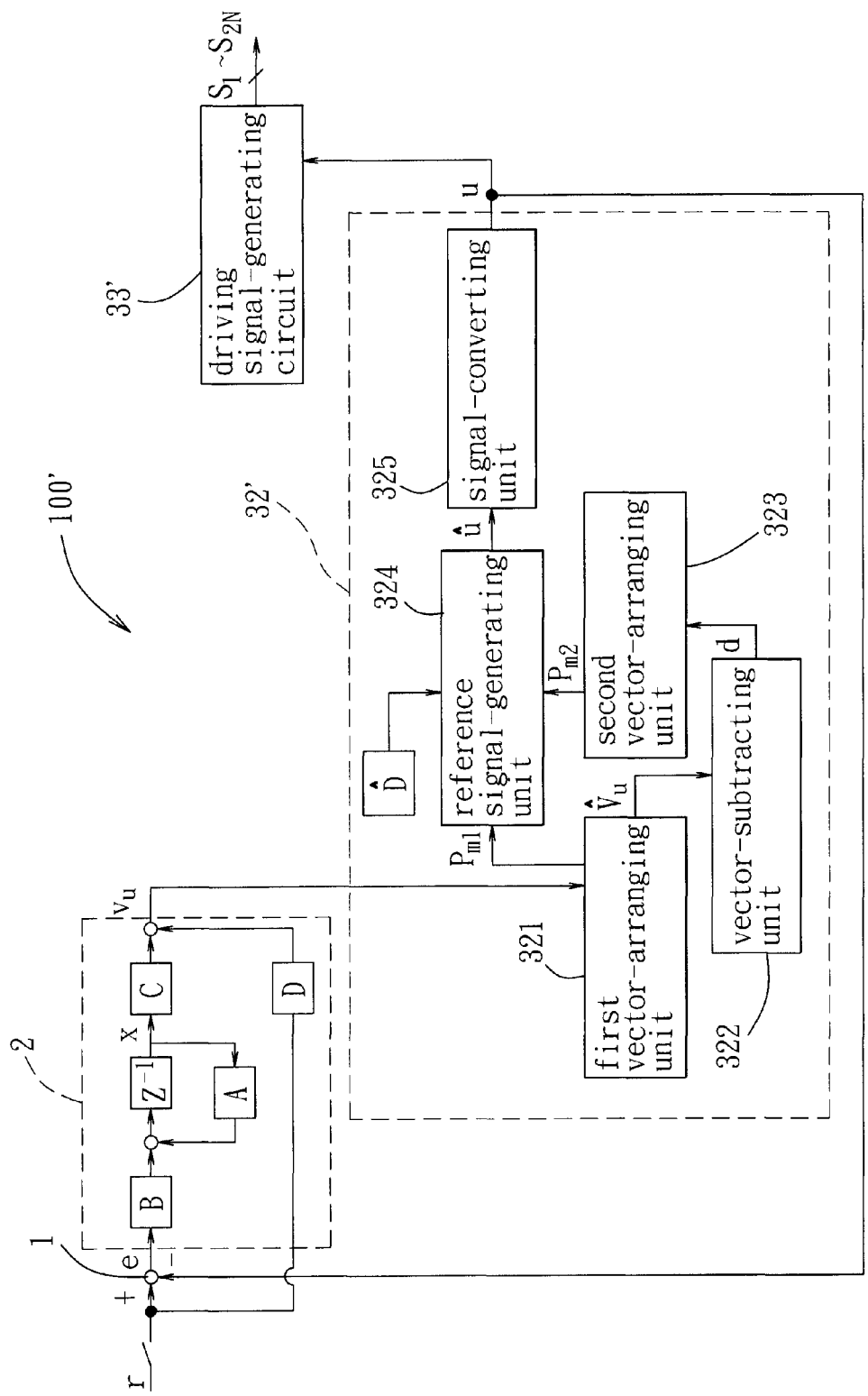
FIG. 18 is a block diagram to illustrate a quantizing circuit of the second preferred embodiment.

The driving device 100' includes a subtracting circuit 1, a filter module 2, and a quantizing module 3. The filter module 2 includes a filter circuit 21 connected to the subtracting circuit 1, and an optimization circuit 22 connected to the filter circuit 21. In this embodiment, the filter circuit 21 is a N input and N output filter circuit 21. The quantizing module 3 includes a quantizing circuit 32' and a driving signal-generating circuit 33'. In this embodiment, with further reference to FIG. 18, the quantizing circuit 32' includes a first vector-arranging unit 321 connected to the optimization circuit 22, a vector-subtracting unit 322 connected to the first vector-arranging unit 321, a second vector-arranging unit 323 connected to the vector-subtracting unit 322, a reference signal-generating unit 324 connected to the first and second vector-arranging units 321, 323, and a signal-converting unit 325 connected to the reference signal-generating unit 324. The driving signal-generating circuit 33' is connected to the signal-converting unit 325 of the quantizing circuit 32'.

Figure 19:
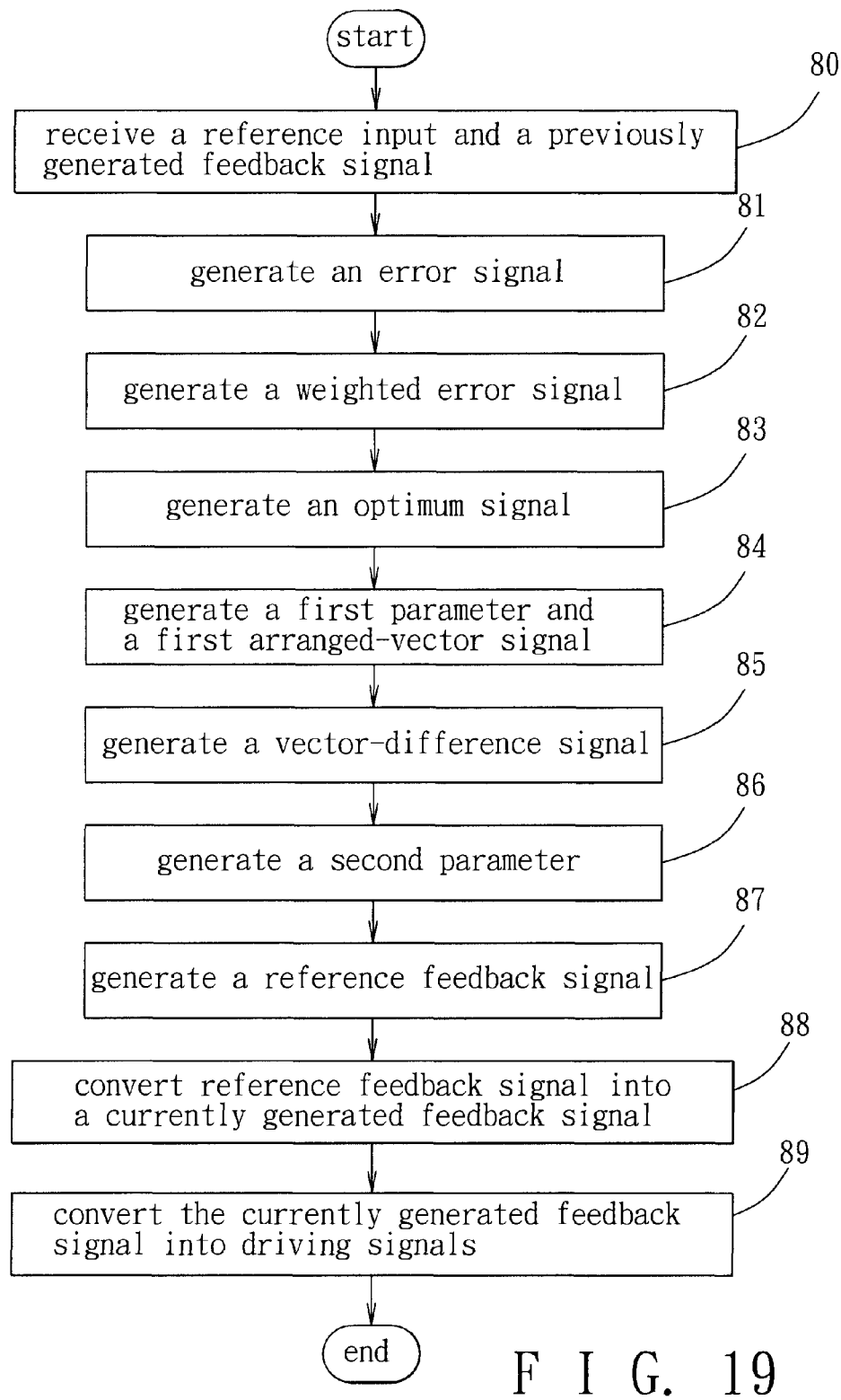
FIG. 19 is a flow chart of the second preferred embodiment of a driving method according to the present invention to be implemented using the driving device shown in FIG. 16.

The second preferred embodiment of a driving method for driving the N-phase inverter 200' to be implemented by the aforementioned driving device 100' according to this invention will now be described with further reference to FIG. 19.

In step 80, the subtracting circuit 1 is configured to receive a reference input (r) and a previously generated feedback signal (u).

In step 81, the subtracting circuit 1 is configured to generate an error signal (e) that corresponds to a difference between the reference input (r) and the previously generated feedback signal (u) and to send the error signal (e) to the filter circuit 21.

In step 82, the filter circuit 21 is configured to receive the error signal (e) sent by the subtracting circuit 1 in step 81, to attenuate the frequency components of the error signal (e) received thereby that are outside of the predetermined frequency range to the minimum, and to generate a weighted error signal (y) and to send the weighted error signal (y) generated thereby and a state parameter (x) of the filter circuit 21 to the optimization circuit 22.

The weighted error signal (y) is generated in this step using a frequency weighting function, which is defined as $$x(k+1)=Ax(k)+Be(k)$$

and $$y(k)=Cx(k)+De(k)$$

where: $x \in R^{Nn \times Nn}$ is a state parameter of the filter circuit 21; $e \in R^{N \times 1}$ is the error signal; $A \in R^{Nn \times Nn}$, $B \in R^{Nn \times N}$, $C \in R^{N \times Nn}$ and $D \in R^{N \times N}$ are weight parameters; and $y \in R^{N \times 1}$ is the weighted error signal (y).

In step 83, the optimization circuit 22 is configured to receive the weighted error signal (y) and the state parameter (x) sent by the filter circuit 21 in step 82 and the reference input (r), to attenuate the weighted error signal (y) to the minimum, to generate an optimum signal ($v_u$), and to send the optimum signal ($v_u$) generated thereby to the first vector-arranging unit 321.

In step 84, the first vector-arranging unit 321 is configured to receive the optimum signal ($v_u$) sent in step 83, to arrange vectors of the optimum signal ($v_u$) received thereby in a descending sequence, to generate a first arranged-vector signal ($\hat{V}_u$) that corresponds to the vectors of the optimum signal ($v_u$) arranged thereby and a first parameter ($P_{m1}$) that describes arrangement of the vectors of the optimum signal ($v_u$) arranged thereby, and to send first parameter ($P_{m1}$) and the first arranged-vector signal ($\hat{V}_u$) generated thereby to the reference signal-generating unit 324 and the vector-subtracting unit 322, respectively.

The first arranged-vector signal ($\hat{V}_u$) and the first parameter ($P_{m1}$) are generated in this step according to $$P_{m1}v_u = \hat{V}_u = [\hat{V}_{u1} \hat{V}_{u2} \ldots \hat{V}_{uN}]^T$$

where $\hat{V}_{u1} \geq \hat{V}_{u2} \geq \ldots \geq \hat{V}_{uN}$ and $P_{m1} \in R^{N \times N}$.

In step 85, the vector-subtracting unit 322 is configured to receive the first arranged-vector signal ($\hat{V}_u$) sent in step 84, to perform subtraction operation on the vectors of the first arranged-vector signal ($\hat{V}_u$) received thereby, to generate a vector-difference signal (d) that corresponds to a result of the subtraction operation performed thereby, and to send the vector-difference signal (d) generated thereby to the second vector-arranging unit 323.

The vector-difference signal (d) is generated in this step according to $$d = \begin{bmatrix} 1 \\ \hat{V}_u \end{bmatrix} - \begin{bmatrix} \hat{V}_u \\ 0 \end{bmatrix} \in R^{(N+1) \times 1}$$

In step 86, the second vector-arranging unit 323 is configured to receive the vector-difference signal (d) sent in step 85, to arrange vectors of the vector-difference signal (d) received thereby in a descending sequence, to generate a second parameter ($P_{m2}$) that describes arrangement of the vectors of the vector-difference signal (d) arranged thereby, and to send the second parameter ($P_{m2}$) generated thereby to the reference signal-generating unit 324.

The second parameter ($P_{m2}$) is generated in this step according to $$P_{m2}d = \hat{d} = [\hat{d}_1 \hat{d}_2 \ldots \hat{d}_{N+1}]^T$$

where $\hat{d}$ is a second arranged-vector signal that corresponds to the vectors of the vector-difference signal (d) arranged by the second vector-arranging unit 323, $\hat{d}_1 \geq \hat{d}_2 \geq \ldots \geq \hat{d}_{N+1}$, and $P_{m2} \in R^{(N+1) \times (N+1)}$.

In step 87, the reference signal-generating unit 324 is configured to receive the first parameter ($P_{m1}$) sent in step 84, the second parameter ($P_{m2}$) sent in step 86, and a reference matrix ($\hat{D}$), to generate a reference feedback signal ($\hat{u}$) based on the first and second parameters ($P_{m1}$, $P_{m2}$) and the reference matrix received thereby, and to send the reference feedback signal ($\hat{u}$) generated thereby to the signal-converting unit 325.

The reference feedback signal ($\hat{u}$) is generated in this step according to $$\hat{u} = P_{m1}^T \hat{D} P_{m2}^T$$

where $\hat{D} = \begin{bmatrix} 0 & 1 & 1 & \cdots & 1 \\ 0 & 0 & \ddots & & \vdots \\ \vdots & \vdots & \cdots & & 1 \\ 0 & 0 & \cdots 0 & & 1 \end{bmatrix} \in R^{N \times (N+1)}$.

In step 88, the signal-converting unit 325 is configured to receive the reference feedback signal ($\hat{u}$) sent in step 87, to convert vectors in the first column of the reference feedback signal ($\hat{u}$) received thereby, which correspond to one of the switch states, into a currently generated feedback signal (u), and to send the currently generated feedback signal (u) to the driving signal-generating circuit 33'. The currently generated feedback signal (u) serves as a next previously generated feedback signal inputted to the subtracting circuit 1 for use in generating a next sequence of driving signals.

In this step, the reference feedback signal ($\hat{u}$) is converted into the currently generated feedback signal (u) according to $$u = \begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix} \hat{u} \begin{bmatrix} 1 \\ 0 \\ \vdots \\ 0 \end{bmatrix}$$

where $\begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix}$ and $\begin{bmatrix} 1 \\ 0 \\ \vdots \\ 0 \end{bmatrix}$ are constant matrices.

In step 89, the driving signal-generating circuit 33' is configured to receive the currently generated feedback signal (u) sent in step 88, and to convert the currently generated feedback signal (u) received thereby into the driving signals ($S_1$ to $S_{2N}$) with reference to a predefined look-up table built into the quantizing module 3.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A driving method for driving a polyphase inverter to be implemented by a driving device, said driving method comprising:
A) configuring the driving device to receive a reference input that includes a fundamental frequency component, and a previously generated feedback signal, wherein the feedback signal is derived from a control signal that is an output of a quantizing module;

B) configuring the driving device to generate an error signal that corresponds to a difference between the reference input and the previously generated feedback signal;

C) configuring the driving device to attenuate the frequency components of the error signal outside a predetermined frequency band to the minimum;

D) configuring the driving device to generate an optimum signal so that the magnitude of error signal within a predetermined frequency band is minimum; and E) configuring the driving device to quantize the optimum signal, and to generate driving signals that correspond to the quantized optimum signal, wherein the driving signals are for driving the polyphase inverter.

2. The driving method as claimed in claim 1, wherein, in step C), the frequency components outside of a predetermined frequency range are attenuated to the minimum using a frequency weighting function.

3. The driving method as claimed in claim 2, wherein the frequency weighting function is defined as $$x(k+1)=Ax(k)+Be(k) \text{ and } y(k)=Cx(k)+De(k),$$

wherein x is a state parameter; A, B, C, and D are weight parameters; k is an integer; e is an error signal; and y is a weighted error signal.

4. The driving method as claimed in claim 1, wherein, in step D), the components within the predetermined frequency range are attenuated to the minimum using an optimization function.

5. The driving method as claimed in claim 4, wherein the optimization function (V) is defined as $$V=y(k)^T P y(k)$$

wherein P is a predefined parameter, T is a transpose operation, y is a weighted error signal, and k is an integer.

6. The driving method as claimed in claim 1, wherein step E) includes the sub-steps of:
   e1) configuring the driving device to generate a control signal that corresponds to the optimum signal; and
   e2) configuring the driving device to convert the control signal generated in sub-step e1) into the driving signals with reference to a predefined look-up table.

7. The driving method as claimed in claim 6, wherein step E) further includes the sub-step of:
   e3) configuring the driving device to transform the control signal into a next previously generated feedback signal for use in generating a next sequence of the driving signals.

8. The driving method as claimed in claim 1, wherein the optimum signal generated in step D) is a N-dimensional vector optimum signal, said driving method further comprising:
   G) configuring the driving device to transform the N-dimensional vector optimum signal into a (N-1)-dimensional vector optimum signal prior to step E), where N=3,
   wherein, the optimum signal quantized in step E) is the (N-1)-dimensional vector optimum signal.

9. The driving method as claimed in claim 8, wherein, in step G), the N-dimensional vector optimum signal ($v_u$) is transformed into the (N-1)-dimensional vector optimum signal ($v_u'$) according to $$v_u'=Q^{-1}Q^{-T}R^T D^T P v_u$$

where Q is a real matrix, T is a transpose operation, D is a weight parameter, P is a predefined parameter, and $$R = \begin{bmatrix} 1 & 0 & -1 \\ 0 & 1 & -1 \end{bmatrix}^T.$$

10. The driving method as claimed in claim 8, wherein step E) includes the sub-steps of:
    e1) configuring the driving device to generate a control signal that corresponds to the (N-1)-dimensional vector optimum signal in step E); and
    e2) configuring the driving device to convert the control signal generated in sub-step e1) into the driving signals with reference to a predefined look-up table.

11. The driving method as claimed in claim 10, wherein step E) further includes the sub-step of:
    e3) configuring the driving device to transform the control signal into a next previously generated feedback signal for use in generating a next sequence of the driving signals.

12. The driving method as claimed in claim 10, wherein the control signal generated in sub-step e1) is one $[1\ 0]^T$, $[0\ 1]^T$, $[1\ -1]^T$, $[0\ 0]^T$, $[-1\ 1]^T$, $[0\ -1]^T$ and $[-1\ 0]^t$, where T is a transpose operation.

13. The driving method as claimed in claim 1, wherein step E) includes the sub-steps of:
    e1) configuring the driving device to generate a currently generated feedback signal that corresponds to the optimum signal in step E); and
    e2) configuring the driving device to convert the currently generated feedback signal generated in sub-step e1) into the driving signals with reference to a predefined look-up table.

14. The driving method as claimed in claim 13, wherein the currently generated feedback signal serves as a next previously generated feedback signal for use in generating a next sequence of the driving signals.

15. The driving method as claimed in claim 1, wherein step E) includes the sub-steps of:
    e1) configuring the driving device to arrange vectors of the optimum signal in a sequence, and to generate a first parameter and an arranged-vector signal, each of which corresponds to the vectors of the optimum signal arranged in sub-step e1);
    e2) configuring the driving device to perform a subtraction operation on the arranged-vector signal generated in sub-step e1), and to generate a vector-difference signal that corresponds to a result of the subtraction operation performed thereby on the arranged-vector signal;
    e3) configuring the driving device to arrange vectors of the vector-difference signal generated in sub-step e2) in a sequence, and to generate a second parameter that corresponds to the vectors of the vector-difference signal arranged in sub-step e3);
    e4) configuring the driving device to generate a reference feedback signal based on the first parameter generated in sub-step e1), the second parameter generated in sub-step e3), and a reference matrix;
    e5) configuring the driving device to convert the reference feedback signal generated in sub-step e4) into a currently generated feedback signal; and
    e6) configuring the driving device to convert the currently generated feedback signal into the driving signals with reference to a predefined look-up table.

16. The driving method as claimed in claim 15, wherein the currently generated feedback signal serves as a next previously generated feedback signal for use in generating a next sequence of the driving signals.

17. The driving method as claimed in claim 15, wherein, in sub-step e1) the vectors of the optimum signal are arranged in a descending sequence.

18. The driving method as claimed in claim 15, wherein, in sub-step e3), the vectors of the vector-difference signal are arranged in a descending sequence.

19. The driving method as claimed in claim 15, wherein, in sub-step e2), the vector-difference signal (d) is generated according to $$d = \begin{bmatrix} 1 \\ \hat{V}_u \end{bmatrix} - \begin{bmatrix} \hat{V}_u \\ 0 \end{bmatrix} \in R^{(N+1) \times 1}$$

where $\hat{V}_u$ is the arranged-vector signal generated in sub-step e1) and N is a phase number of the polyphase inverter.

20. The driving method as claimed in claim 15, wherein, in sub-step e4), the reference feedback signal (û) is generated according to $$\hat{u} = P_{m1}^T \hat{D} P_{m2}^T$$

wherein $P_{m1}$ is the first parameter generated in sub-step e1), $P_{m2}$ is the second parameter generated in sub-step e3), $\hat{D}$ is the reference matrix in sub-step e4), and T is a transpose operation.

21. The driving method as claimed in claim 15, wherein the reference matrix ($\hat{D}$) is defined as $$\hat{D} = \begin{bmatrix} 0 & 1 & 1 & \cdots & 1 \\ 0 & 0 & \ddots & & \vdots \\ \vdots & \vdots & \cdots & & 1 \\ 0 & 0 & \cdots 0 & & 1 \end{bmatrix} \in R^{N \times (N+1)}$$

wherein N is a phase number of the polyphase inverter.

22. The driving method as claimed in claim 15, wherein, in sub-step e5), the reference feedback signal (û) is converted into the currently generated feedback signal (u) according to $$u = \begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix} \hat{u} \begin{bmatrix} 1 \\ 0 \\ \vdots \\ 0 \end{bmatrix}$$

where $$\begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix} \text{ and } \begin{bmatrix} 1 \\ 0 \\ \vdots \\ 0 \end{bmatrix}$$

are constant matrices.

23. A driving device for driving a polyphase inverter, said driving device comprising:
a subtracting circuit configured to receive a reference input that includes a fundamental frequency component, and a previously generated feedback signal and to generate an error signal that corresponds to a difference between the reference input and the previously generated feedback signal, the feedback signal being derived from a control signal that is an output of a quantizing module;
a filter module coupled to said subtracting circuit, and configured to attenuate the magnitude of the error signal to the minimum, and to generate an optimum signal; and
said quantizing module coupled to said filter module, and configured to quantize the optimum signal, and to generate driving signals that correspond to the quantized optimum signal, wherein the driving signals are for driving the polyphase inverter.

24. The driving device as claimed in claim 23, wherein said filter module includes a filter circuit coupled to said subtracting circuit, and configured to attenuate the frequency components of the error signal that are outside of a predetermined frequency range to the minimum using a frequency weighting function.

25. The driving device as claimed in claim 24, wherein the frequency weighting function is defined as $$x(k+1) = Ax(k) + Be(k) \text{ and } y(k) = Cx(k) + De(k)$$

wherein x is a state parameter; A, B, C, and D are weight parameters; k is an integer; e is an error signal; and y is a weighted error signal.

26. The driving device as claimed in claim 23, wherein said filter module includes an optimization circuit coupled to said filter circuit, and configured to attenuate the frequency components of the error signal that are within the predetermined frequency range to the minimum using an optimization function.

27. The driving device as claimed in claim 26, wherein the optimization function (V) is defined as $$V = y(k)^T P y(k)$$

wherein P is a predefined parameter, T is a transpose operation, y is a weighted error signal and k is an integer.

28. The driving device as claimed in claim 23, wherein the optimum signal generated by said filter module is a N-dimensional vector optimum signal, said quantizing module including
a dimension-transforming circuit coupled to said filter module, and configured to transform the N-dimensional vector optimum signal into a (N-1)-dimensional vector optimum signal, where N = 3, and
a quantizing unit coupled to said dimension-transforming circuit, and configured to quantize the (N-1)-dimensional vector optimum signal, and to generate driving signals that correspond to the (N-1)-dimensional vector quantized optimum signal thereby.

29. The driving device as claimed in claim 28, wherein the N-dimensional vector optimum signal ($v_u$) is transformed into the (N-1)-dimensional vector optimum signal ($v_u'$) by said dimension-transforming circuit according to $$v_u' = Q^{-1} Q^{-T} R^T D^T P v_u$$

wherein Q is a real matrix, P is a predefined parameter, $$R = \begin{bmatrix} 1 & 0 & -1 \\ 0 & 1 & -1 \end{bmatrix}^T$$

T is a transpose operation, and D is a weight parameter.

30. The driving device as claimed in claim 28, wherein said quantizing module is built with a predefined look-up table, and said quantizing unit includes a quantizing circuit coupled to said dimension-transforming circuit, and configured to quantize the (N-1)-dimensional vector optimum signal, and to generate a control signal that corresponds to the (N-1)-dimensional vector optimum signal, and a driving signal-generating circuit coupled to said quantizing circuit, and configured to convert the control signal generated by said quantizing circuit into the driving signals with reference to said predefined look-up table.

31. The driving device as claimed in claim 30, further comprising a second dimension-transforming circuit coupled to said subtracting circuit and said quantizing circuit, and configured to transform the control signal into a next previously generated feedback signal for use in generating a next sequence of driving signals.

32. The driving device as claimed in claim 30, wherein the control signal generated by said quantizing circuit is one of $[1\ 0]^T$, $[0\ 1]^T$, $[1\ -1]^T$, $[0\ 0]^T$, $[-1\ 1]^T$, $[0\ -1]^T$ and $[-1\ 0]^T$, where T is a transpose operation.

33. The driving device as claimed in claim 30, wherein the control signal generated by said quantizing circuit is a (N-1)-dimensional control signal, said driving device further comprising a second dimension-transforming circuit coupled to said subtracting circuit and said quantizing circuit, and configured to transform the (N-1)-dimensional control signal into a N-dimensional currently generated feedback signal.

34. The driving device as claimed in claim 33, wherein the currently generated feedback signal serves as a next previously generated feedback signal for use in generating a next sequence of the driving signals.

35. The driving device as claimed in claim 23, further comprising a sampling switch coupled to said subtracting circuit, and configured to sample the reference input prior to receipt of the reference input by said subtracting circuit.

36. The driving device as claimed in claim 23, wherein said quantizing module is built with a predefined look-up table, and includes a quantizing circuit coupled to said filter module, and configured to quantize the optimum signal generated by said filter module, and to generate a currently generated feedback signal that corresponds to the optimum signal, and a driving signal-generating circuit coupled to said quantizing circuit, and configured to convert the currently generated feedback signal generated by said quantizing circuit into the driving signals with reference to said predefined look-up table.

37. The driving device as claimed in claim 36, wherein the currently generated feedback signal generated by said quantizing circuit serves as a next previously generated feedback signal for use in generating a next sequence of the driving signals.

38. The driving device as claimed in claim 36, wherein said quantizing circuit includes a first vector-arranging unit coupled to said filter module, and configured to arrange vectors of the optimum signal generated by said filter module in a sequence, and to generate a first parameter that corresponds to the vectors of the optimum signal arranged thereby, a vector-subtracting unit coupled to said first vector-arranging unit, and configured to perform a subtraction operation on the vectors of the optimum signal arranged by said first vector-arranging unit, and to generate a vector-difference signal that corresponds to a result of the subtraction operation performed thereby, a second vector-arranging unit coupled to said vector-subtracting unit, and configured to arrange vectors of the vector-difference signal generated by said vector-subtracting unit in a sequence, and to generate a second parameter based on the vectors of the vector-difference signal arranged thereby, a reference signal-generating unit coupled to said first and second vector-arranging units, and configured to generate a reference feedback signal based on the first parameter generated by said first vector-arranging unit, the second parameter generated by said second vector-arranging unit, and a reference matrix; and a signal-converting unit coupled to said reference signal-generating unit, and configured to convert the reference feedback signal generated by said reference signal-generating unit into the currently generated feedback signal.

39. The driving device as claimed in claim 38, wherein the currently generated feedback signal serves as a next previously generated feedback signal for use in generating a next sequence of the driving signals.

40. The driving device as claimed in claim 38, wherein the vectors of the optimum signal are arranged by said first vector-arranging unit in a descending sequence.

41. The driving device as claimed in claim 38, wherein the vectors of the vector-difference signal are arranged by said second vector-arranging unit in a descending sequence.

42. The driving device as claimed in claim 38, wherein the vector-difference signal (d) is generated by said vector-subtracting unit according to $$d = \begin{bmatrix} 1 \\ \hat{V}_u \end{bmatrix} - \begin{bmatrix} \hat{V}_u \\ 0 \end{bmatrix} \in R^{(N+1) \times 1}$$

where $\hat{V}_u$ is a signal that corresponds to the vectors of the optimum signal arranged by said first vector-arranging unit, and N is a phase number of the polyphase inverter.

43. The driving device as claimed in claim 38, wherein the reference feedback signal (û) is generated by said reference signal-generating unit according to $$\hat{u} = P_{m1}^T \hat{D} P_{m2}^T$$

where $P_{m1}$ is the first parameter generated by said first vector-arranging unit, $P_{m2}$ is the second parameter generated by said second vector-arranging unit, $(\hat{D})$ is the reference matrix, and T is a transpose operation.

44. The driving device as claimed in claim 38, wherein the reference matrix $(\hat{D})$ is defined as $$\hat{D} = \begin{bmatrix} 0 & 1 & 1 & \cdots & 1 \\ 0 & 0 & \ddots & & \vdots \\ \vdots & \vdots & \cdots & & 1 \\ 0 & 0 & \cdots 0 & & 1 \end{bmatrix} \in R^{N \times (N+1)}$$

wherein N is a phase number of the polyphase inverter.

45. The driving device as claimed in claim 38, wherein the reference feedback signal (û) is converted by said signal-converting unit into the currently generated feedback signal (û) according to $$u = \begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix} \hat{u} \begin{bmatrix} 1 \\ 0 \\ \vdots \\ 0 \end{bmatrix}$$

where $\begin{bmatrix} 1 & -1 & 0 & \cdots & 0 \\ 0 & 1 & -1 & 0 & \vdots \\ \vdots & \ddots & \ddots & \ddots & 0 \\ 0 & & \ddots & \ddots & -1 \\ -1 & 0 & \cdots & 0 & 1 \end{bmatrix}$ and $\begin{bmatrix} 1 \\ 0 \\ \vdots \\ 0 \end{bmatrix}$ are constant matrices.

\* \* \* \* \*